Dec. 29, 1936.   W. HUG   2,065,922
CARRIER ROD OPERATING MECHANISM
Filed Dec. 21, 1935   7 Sheets-Sheet 1
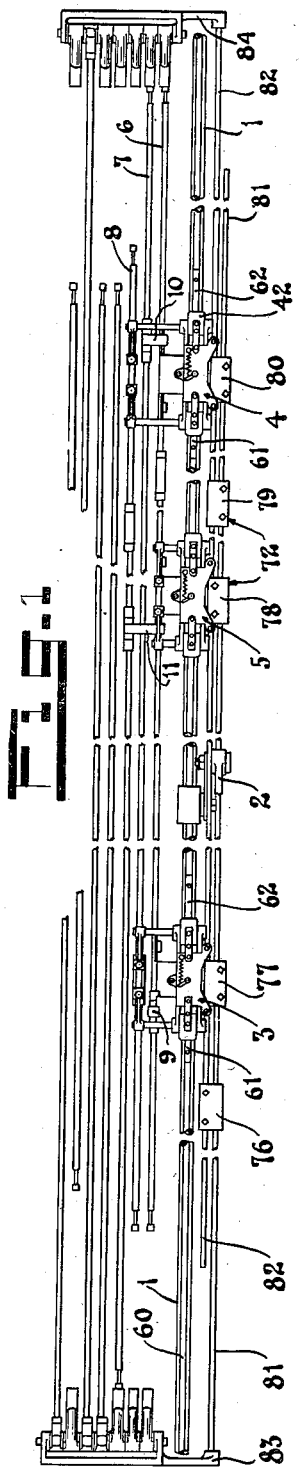
INVENTOR.
William Hug
BY
his ATTORNEY.

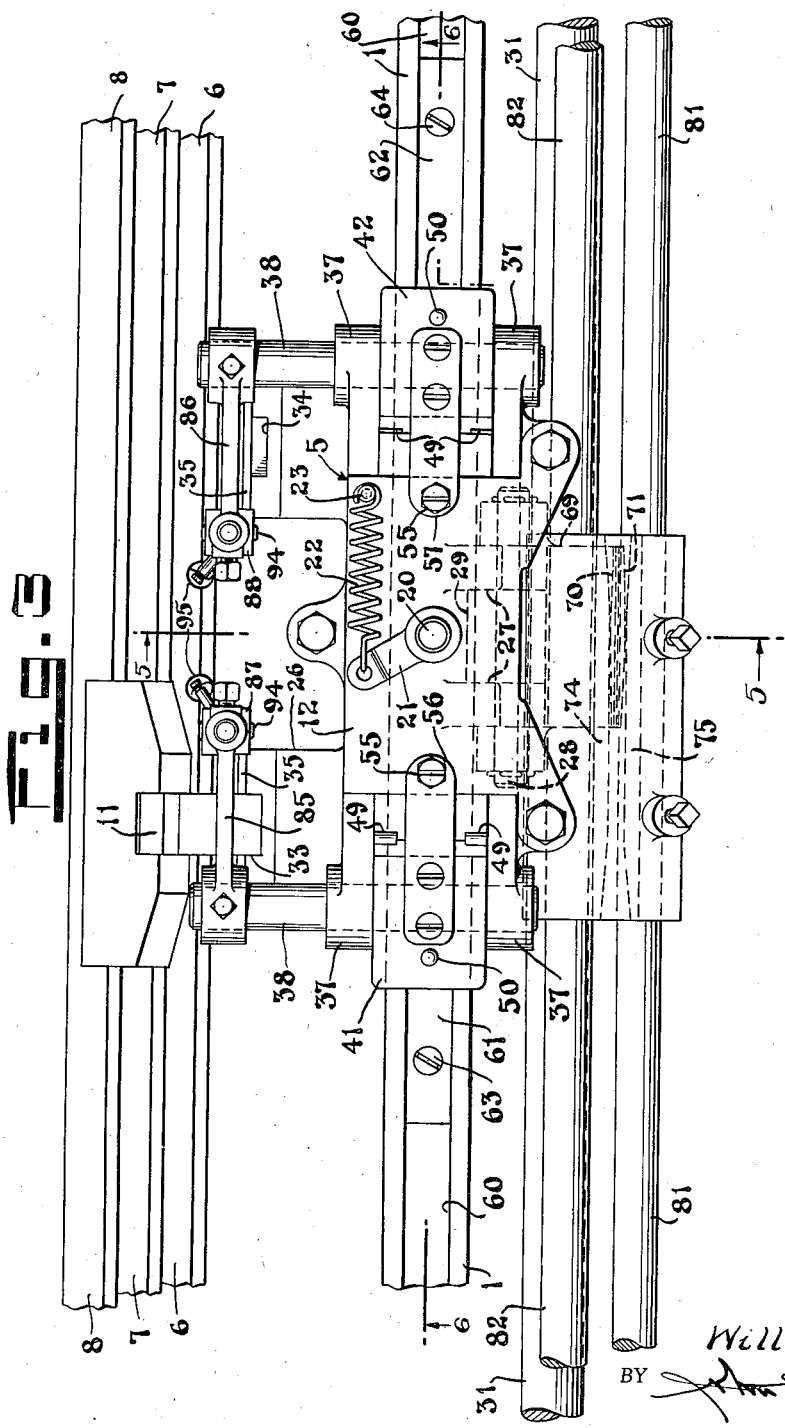

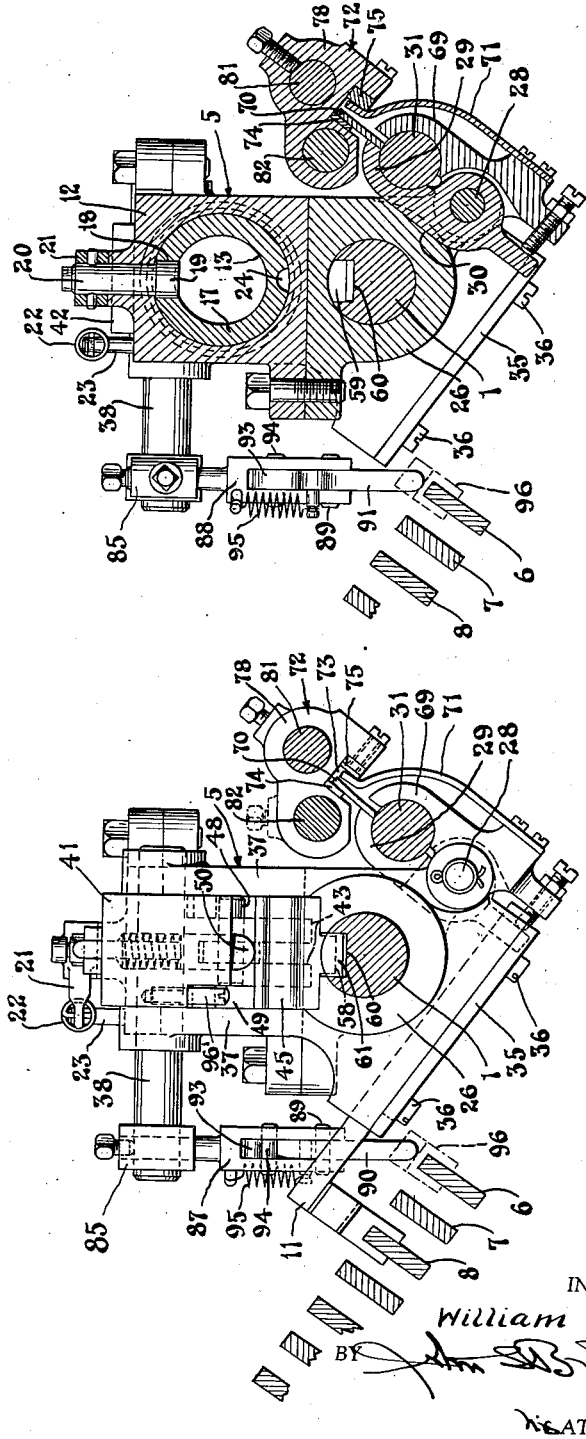

Dec. 29, 1936.  W. HUG  2,065,922
CARRIER ROD OPERATING MECHANISM
Filed Dec. 21, 1935  7 Sheets-Sheet 4
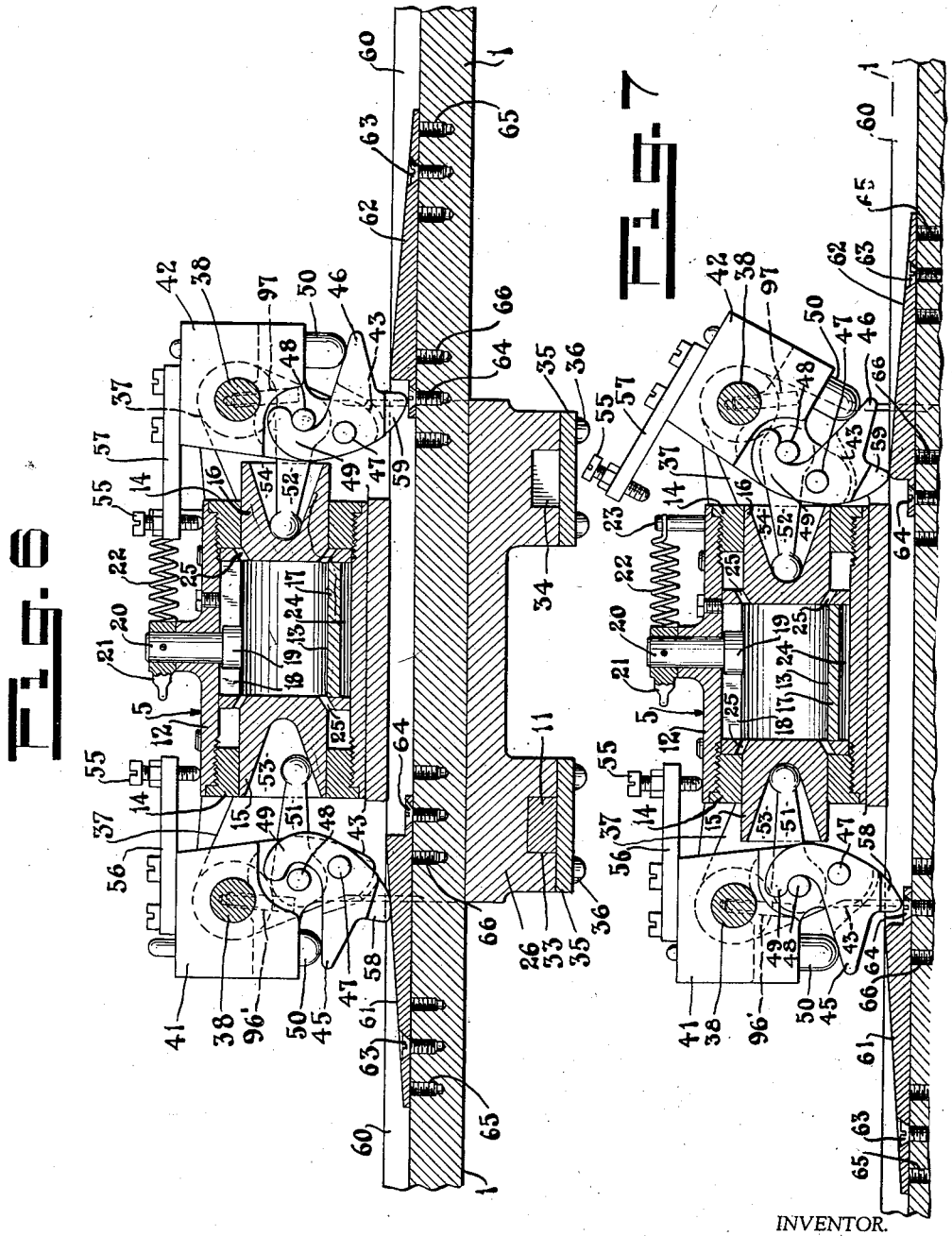
INVENTOR.
William Hug
BY 
his ATTORNEY.

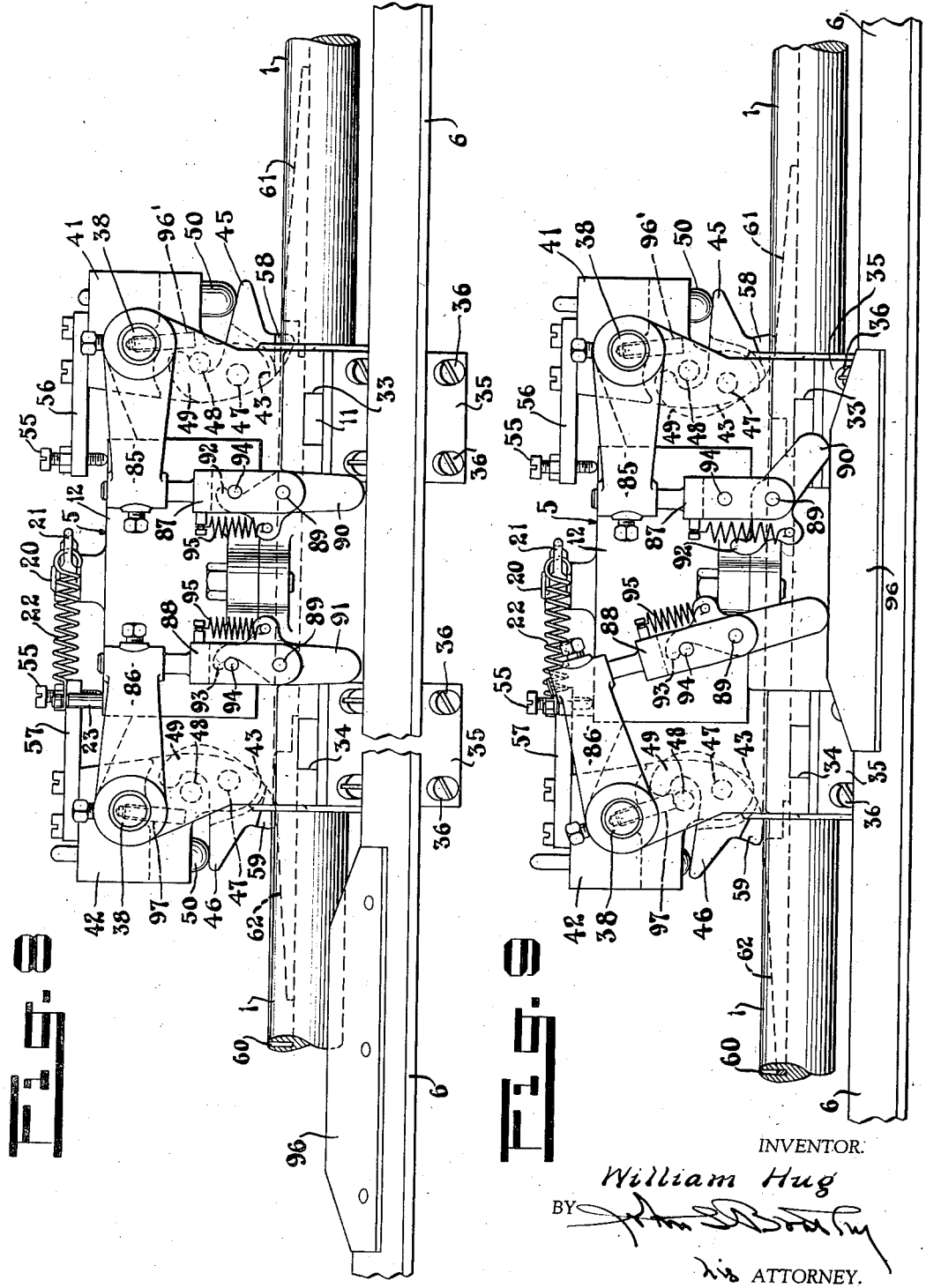

Dec. 29, 1936. W. HUG 2,065,922
CARRIER ROD OPERATING MECHANISM
Filed Dec. 21, 1935 7 Sheets-Sheet 6
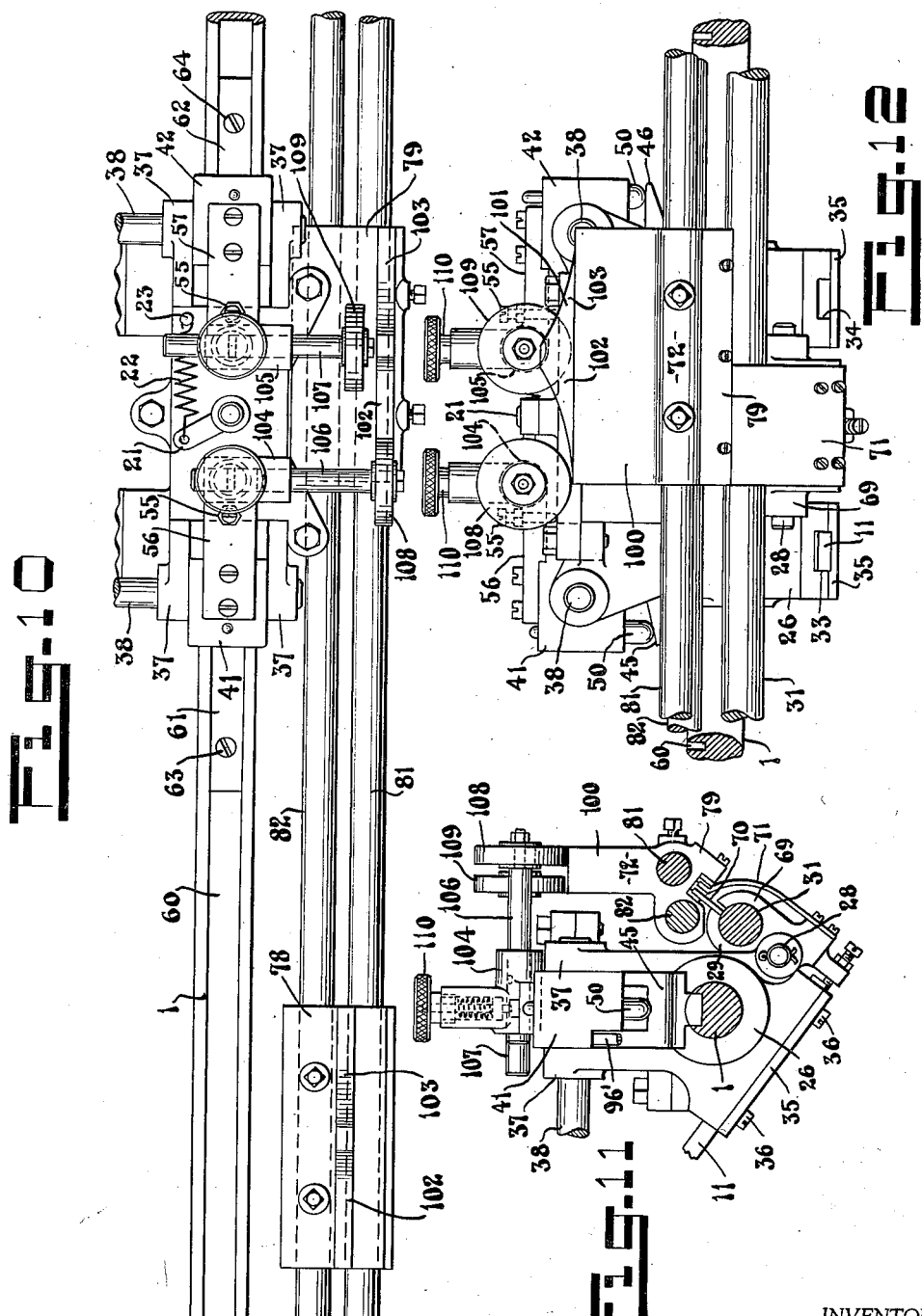
INVENTOR.
William Hug
BY
his ATTORNEY.

Dec. 29, 1936.  W. HUG  2,065,922
CARRIER ROD OPERATING MECHANISM
Filed Dec. 21, 1935  7 Sheets-Sheet 7
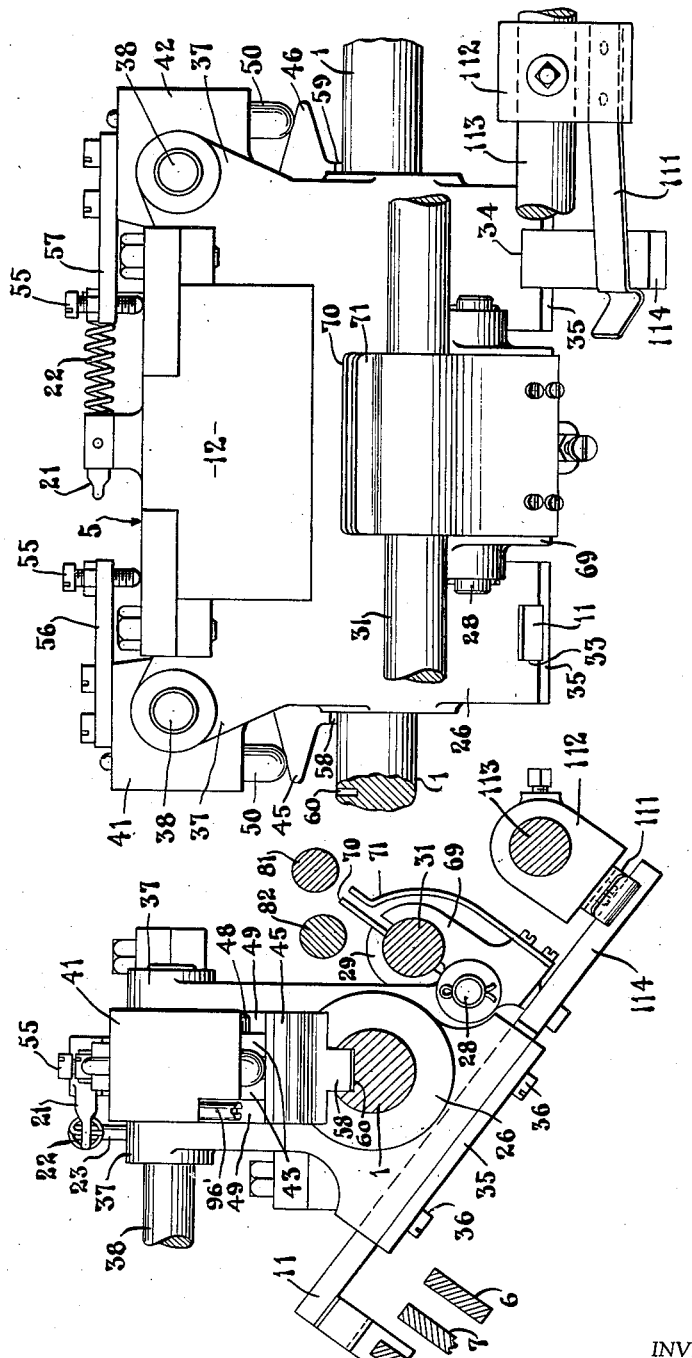
INVENTOR.
William Hug
BY
his ATTORNEY.

Patented Dec. 29, 1936

2,065,922

UNITED STATES PATENT OFFICE 2,065,922

CARRIER ROD OPERATING MECHANISM

William Hug, Clifton, N. J.

Application December 21, 1935, Serial No. 55,528

18 Claims. (Cl. 66—127)

This invention relates to machines for operating the carrier rods of a flat knitting machine. One of its objects is to supplant the usual friction box type of drive by a drive which is operatively connected to the carrier rods only while they are in motion and which consequently requires less power and lessens vibration and wear. The drive of this invention also is more positive and permits the maintenance of a uniform lead of predetermined length throughout the carrier rod stroke. It eliminates the necessity for end latches and other similar auxiliary devices for preventing rebound and dragging of carrier rods. Each carrier rod is connected to its driving means whether in use or idle so that the liability of error in making the proper connection is eliminated. It is provided with a means for reducing the speed of the carrier rod just before it makes contact with an end stop thus reducing the impact and for similarly controlling the carrier rod speed during partial inward strokes as in heel reinforcing, for example. It may be used without change other than simple adjustment for straight knitting, ringless, plating, split seam and many other kinds of work which ordinarily require distinct carrier rod drives.

Another important advantage is that the invention may be applied to a standard flat knitting machine with only minor and inexpensive alterations. Although the friction drive boxes have been eliminated the friction rod itself and its entire driving mechanism may be utilized without change except a small alteration in the rod itself.

One form of the invention which has been selected for the purpose of explanation herein and without the intention of limiting the invention thereto is disclosed by the accompanying drawings, in which—

Figure 1 is a diagrammatic plan view of a flat knitting machine of generally standard construction showing seven carrier rods with three of which are associated the novel driving devices of this invention;

Figs. 2, 3 and 4 are respectively a back elevation, a plan view and an end view of one of the novel driving devices;

Fig. 5 is a cross-section of the same device along the line 5—5 of Figs. 2 and 3 viewed as indicated by the arrows;

Fig. 6 is a view partly in section of the same device on the line 6—6 of Fig. 3 viewed as indicated by the arrows;

Fig. 7 is a view similar to Fig. 6 showing the position of the parts at a different point in its operation;

Fig. 8 is a front plan view of the same device showing particularly the elements required for ringless knitting;

Fig. 9 is a similar view showing the position of some of the parts at another point of operation;

Figs. 10, 11 and 12 are respectively plan, end and side elevation views showing particularly a drive for reducing the speed of a carrier rod at the end of its stroke to lessen its impact against its end stop; and Figs. 13 and 14 are respectively end and front elevation views of a device for holding an idle carrier rod and its drive box out of action.

The knitting machine is provided with the usual reciprocable carrier rods of which seven are shown in Fig. 1 and the usual friction rod from which the friction boxes have been removed. Because of the elimination of the friction drive devices this rod will be called hereinafter a drive rod to avoid confusion. Drive rod 1 may be connected to the usual Coulier motion in the usual way. The driving connections form no part of the present invention and, consequently, are merely indicated by the reciprocating lever 2. As is well known lever 2 is customarily utilized to reciprocate both the drive rod 1 and the slur cock bar (not shown). If desired two separate levers of this character operated from two separate Coulier cams, may be utilized as shown in my Patent No. 2,022,468 issued November 26, 1935. This latter arrangement provides independent control of the thread laying and loop forming mechanisms.

Slidably mounted on drive rod 1 are carrier rod drive boxes, one for each carrier rod or for any number of the carrier rods. In Fig. 1 only three of these drive boxes are shown. They are numbered 3, 4 and 5 and are connected to carrier rods 6, 7 and 8 respectively, by fingers 9, 10 and 11 respectively, which rest in the recesses of the usual dogs on the carrier rods. This connection between each drive box and its carrier rod may be maintained irrespective of whether the particular rod is in operation or idle thus freeing the operator from one of his many duties and eliminating the possibility of error in making connection. The other rods may be driven by similar drive boxes or by any other suitable type of driving device.

All of the drive boxes are of similar construction. Drive box 5 has been selected for description and is shown in detail in Figs. 2-7. It consists of a body 26 slidably mounted upon drive rod 1 and having at each end upwardly and outwardly extending spaced arms 37 between which is bolted a cylinder box 12 in which is a longitudinal machined cylinder 13, the ends of which are partially closed by annular threaded plugs 14 (see Figs. 6 and 7). Two opposed pistons 15 and 16 make a close sliding fit with cylinder 13 and with the respective annular plugs 14 as best shown in Figs. 6 and 7. Between pistons 15 and 16 in cylinder 13 and in close sliding contact with it is a sleeve 17. As shown in Figs. 6 and 7 this sleeve is of such a length as to permit pistons 15 and 16 to reciprocate as will be hereinafter explained.

Sleeve 17 is split longitudinally throughout its length sufficient material being removed therefrom to provide a channel 18 for the reception of a cam 19 mounted upon the lower end of a shaft 20 vertically and rotatably supported in the top of body 26. An arm 21 affixed to the outer end of shaft 20 is connected to a spring 22, the other end of which is attached to any suitably positioned anchorage 23 which will cause spring 22 to exert a rotative effort upon arm 21 and consequently upon cam 19 whereby split sleeve 17 is expanded against the walls of cylinder 13 with a definite pressure determined by the strength of spring 22. In this way the frictional relation between sleeve 17 and cylinder 13 is automatically maintained constant. To facilitate the expansion of sleeve 17 it may be weakened by a longitudinal groove 24 (Fig. 5) diametrically opposed to channel 18.

The interior of cylinder 13 should be filled with oil or other suitable lubricant to prevent undue friction and wear of the pistons, sleeve and cylinder. To permit the lubricant to pass freely from one side of each piston head to the other each piston head is pierced by a series of ducts 25. Two bosses 27 (Fig. 2) on body 26 form the support for a pivot shaft 28 upon which is mounted a guide piece 29 one side of which fits snugly a suitable seat in casting 26, as shown at 30 (Fig. 5). Guide piece 29 partly encircles a fixed shaft 31 and thus serves as a means for preventing the drive block from swinging around drive shaft 1, while permitting it to slide freely thereon.

Also attached to body 26 is a plate 32 provided with slots 33 and 34, either of which is adapted to receive carrier rod driving finger 11 which is shown clamped in slot 33 by a plate 35 and set screws 36 so that its forward end is in engagement with its carrier rod 8, (see Figs. 1, 4 and 6).

Through the outer end of each arm 37 passes a rotatable shaft 38. Upon shafts 38 between forks 37 are swingably mounted blocks 41, 42 the lower ends of which carry a fork 43, (Figs. 4, 6 and 7) over each of which is straddled a driving dog 45, 46 swingable upon a pin 47. The inward swing of dogs 45, 46 is limited by a pin 48 passing through both arms of forks 43, and engageable with the curved extensions 49 of driving dogs 45, 46 in contact with which it is normally maintained by spring plunger 50.

Pins 48 also serve as the pivots for connecting rods 51, 52 the other ends of which lie loosely within conical recesses 53 and 54 in the outer ends of pistons 15 and 16 respectively.

The swinging of forks 43 and 44 on blocks 41 and 42 outwardly away from body 26 is limited by adjustable stop screws 55 in arms 56 and 57 attached to blocks 41 and 42 so that screws 55 will engage with the top of the body 12 as shown, for example, in Figs. 2, 6 and 7.

The lower extremities of driving dogs 45 and 46 are narrowed into tongues 58 and 59 respectively, adapted to enter groove 60 in drive rod 1 and to engage with drive keys 61 and 62 positioned therein. For driving carrier rod 8 from right to left tongue 59 must be positioned to engage key 62 as shown in Fig. 6. For driving carrier rod 8 from left to right tongue 58 must be positioned so as to engage key 61 as shown in Fig. 7. This is accomplished in the following manner: Referring to Fig. 6 and assuming that carrier rod 8 is resting against its right end stop, drive box 5 which is connected to this carrier rod by finger 11 will also be at its extreme right position. Also as shown in Fig. 6 pistons 15 and 16 and the intervening sleeve 17 are in their extreme right positions in cylinder 13. Connecting rod 52 will have swung block 42 into the position shown which also positions nose 59 of drive dog 46 in the groove 60 of drive rod 1. Drive key 62 is positioned in drive rod 1 so that when the drive rod also rests at the extreme right the driving face of the key will be somewhat to the right of nose 59.

The frictional resistance of sleeve 17 in cylinder 13 must be great enough so that when drive rod 1 is propelled to the left key 62 will engage nose 59 and propel the entire drive box and its connected carrier rod 8 along with it without displacing pistons 15 and 16 or sleeve 17 from the positions shown in Fig. 6. Thus the entire drive box, drive rod and carrier rod move as a unit.

It will be noted that the drive dogs move into and out of operating position automatically and that the operating dog is maintained in engagement with the drive rod during the carrier rod traverse by the frictionally governed connecting rod. Also that through the cooperation of the drive rod key the drive dog in engagement therewith and the connecting rod the frictionally held sleeve 17 is not only moved so as to permit the operating drive dog to disengage itself from the drive rod key at the end of the carrier rod stroke but by such movement is positioned so as to maintain the other drive dog in operating position with the other drive key during the reverse stroke of the drive rod. Thus one dog controls the operation of the other through the intermediate frictionally governed linkage.

The term "frictionally governed" as used in the claims refers to a device of this character in which there is an element movable with respect to another but in definite frictional engagement therewith and which because of its frictional characteristic performs the two functions of maintaining a driving means in driving position during its period of operation and of permitting it to move out of operating position at the end of its period of operation without the intervention of any external releasing mechanism.

When the end of the carrier rod stroke is reached the drive rod continues to move on in the customary manner. Since the drive block must necessarily stop with the stopping of the carrier rod the pressure of the driving key 62 against tongue 59 increases so that the resistance of sleeve 17 is overcome and the dog 46 and block 42 swing inward and as a unit until tongue 59 is lifted sufficiently to release key 62 as shown in Fig. 7. This swinging motion of block 42 drives connecting rod 52 to the left and through it propels pistons 16 and 15 and sleeve 17 to the left within cylinder 13.

During the travel of the carrier rod 8 from right to left the tongue 58 of the other drive dog 45 has been riding upon the back of the other key 61 as shown in Fig. 6 with the inner end of connecting rod 51 lying in the side of conical recess 53 of piston 15. After carrier rod 8 has stopped the subsequent travel of drive rod 1 will ultimately permit tongue 58 of drive dog 45 to snap down in front of drive key 61 as shown in Fig. 7 into position to cooperate with key 61 in driving the drive box from left to right. Also the movement of the pistons to the left described above causes the free end of connecting rod 51 to assume its driving position against the inner end of recess 53 of piston 15. Meanwhile block 32 has gravitated again to its original position, tongue 59 riding upon the back of key 62 and swinging about pivot pin 47 in a manner similar to that of block 41 and tongue 58 in Fig. 6, connecting rod 52 sliding along the wall of recess 54. At the end of the stroke from left to right the reverse action of the parts of the drive box takes place to re-establish them in the positions shown in Fig. 6.

Keys 61 and 62 are shown as fastened into groove 10 of drive rod 1 by means of machine screws 63 and 64. Other pairs of tapped holes such as 65 and 66 spaced at any intervals may be provided so that the positions of keys 61 and 62 with respect to the drive dogs 45 and 46 may be shifted. In this way the lead of one carrier over another and with respect to the slur cocks may be varied to meet special requirements as in plating.

It will be noted that since the only positive connection between the drive box and drive rod is through keys 61 and 62 and drive dogs 45 and 46 the carrier rod does not begin to move at the start of the drive rod stroke. In consequence the lead of the thread carrier with respect to the slur cocks as determined by the positions of keys 61 and 62 upon drive rod 1 remains constant throughout each carrier rod stroke, regardless of its length. Also since each drive block is disconnected from the drive rod when the carrier rod stroke is completed there is no waste of power or wear of parts such as results from the useless pulling of the friction rod through the friction boxes characteristic of the familiar friction drive and vibration is greatly reduced.

Since the drive box is riding freely upon the moving drive rod between carrier rod strokes it is essential that it be restrained from moving until the drive rod key contacts with the nose of the drive dog as above described. For this purpose a clutch is incorporated in the drive box. As shown in Figs. 1–5 it consists of the guide 29 already referred to as partly encircling shaft 31 to prevent the driving head from swinging about the drive shaft and complementary element 69 provided on shaft 28 and encircling the other side of shaft 31. Both guide 29 and element 69 are provided with resilient fingers 70 and 71 respectively, adapted to enter and be pressed together by a clamp 72. There are two of these clamps for each driving box positioned so as to perform their respective functions at the end of opposite carrier rod strokes. Each consists of a casting as shown in Figs. 4 and 5 provided with a recess 73 in which are fitted two shoes 74 and 75 one of which (75) is adjustable and between which fingers 70 and 71 pass and are pressed together. This clamps clutch elements 29 and 69 against shaft 31 sufficiently to prevent the drive box from rebounding under the impact of the carrier rod against its end stop.

As stated, there are a pair of clamps 72 for each drive box. For example, in Fig. 1 clamps 76 and 77 function with drive box 3 for carrier rod 6, clamps 78 and 79 with drive box 5 for carrier rod 8 and two similar clamps of which the right hand one only is shown at 80 because of space limitations in the drawing with drive box 4 for carrier rod 7. The companion clamp which is not shown, is positioned with respect to clamp 80 similarly to the position of clamp 76 with respect to clamp 77 since both drive boxes 3 and 4 and their carrier rods are similarly positioned at the right end of their strokes.

Each of the clamps are supported by two rods 81 and 82, rod 81 being attached to narrowing head 83 and rod 82 to narrowing head 84 and being otherwise supported in parallel relation and so that they will move with the narrowing heads. Clamps 76, 79 and the companion clamp to clamp 80 are fixed to rod 82 and slide upon the other rod 81. Similarly clamps 77, 78 and 80 are fixed to rod 81 and slide upon rod 82. Therefore, whenever the narrowing heads are moved the clamps will be moved correspondingly so that their effective positions remain unaltered regardless of the length of stroke of the carrier rods.

Each clamp is considerably longer than the width of the finger with which it functions, as shown in Fig. 3. Each clamp is positioned so that at the end of a carrier rod stroke the corresponding clamp finger will travel to the far end of the clamp as shown in Fig. 3, in which the drive box is assumed to be at its extreme right position to correspond with Fig. 1. During shorter carrier rod strokes such as those in heel reinforcing, for example, the clamp fingers may slide within the clamp without leaving it so that one clamp suffices to control the carrier rod at both ends of such shorter strokes. The amount of friction created by the clutch finger in the clamps need not be great to secure adequate clutching action and the fingers are readily pulled through the clamps without otherwise affecting the action of the drive boxes and drive rod. As stated, the clamps are provided with adjustable shoes so that the friction may be maintained at the minimum required. These clamps eliminate the necessity for end latches and their operating mechanisms.

The drive heretofore described is useful for straight knitting, reinforcing, plating and many other types of knitting. It may also be utilized for knitting ringless fabric (of the three thread type for example) by means of a few simple accessory parts. As shown in Figs. 1 and 3, shafts 38 extend forward over the carrier rods. On the end of shafts 38 are fixed arms 85, 86, projecting towards each other. As shown in Figs. 8 and 9 arms 85 and 86 are provided at their free ends with downwardly extending projections 87 and 88 respectively, upon which are pivoted at 89 levers 90 and 91 respectively. Levers 90 and 91 are normally maintained in alignment with projections 87 and 88 through the engagement of extensions 92, 93 with pins 94 under the urge of springs 95.

Also shafts 38 are provided with pins 96' and 97 respectively, best shown in Figs. 4, 8 and 9 adapted to engage with the curved extensions 49 of the driving dogs not heretofore utilized in connection with pins 48, as previously described, to swing the dogs upon their pivots 47 out of engaging position with the drive keys. That is to say, whenever lever 91, for example, is moved upward as shown in Fig. 9, shaft 38 will be rocked and pin 97 swung inward to engage and swing nose 59 of drive dog 46 out of the path of drive key 62 thus disconnecting drive box and its carrier rod from key 62 of the drive rod. Similarly if lever 90 is raised it will cause the disconnection of nose 58 of drive dog 45 from its drive key 61. Therefore, it will be evident that by lifting lever 91 at the end of a stroke of carrier rod 7 to the left (as viewed in Figs. 8 and 9) or by raising lever 90 when carrier rod 7 is at the end of its stroke to the right the drive box and its carrier rod will be left behind during the next stroke of the drive rod 1. Since all of the drive boxes for carrier rods 6, 7 and 8 are of similar construction, it will also be obvious that during any drive rod stroke any one of the carrier rods may be driven and any two caused to remain idle and also that the rods may be driven in the sequence required for ringless knitting.

Means for automatically operating the selecting mechanism of each drive box may be provided upon the carrier rods themselves. That is to say, the carrier rod and drive box driven upon one stroke may be released from the drive rod at the end of the stroke by the carrier rod which is to be driven upon the following stroke. For example, if the rods are to be driven in the sequence 7, 8, 6 and repeat, carrier rods 6 and 7 and their driving boxes will be positioned at the right and carrier rod 8 and its driving box at the left as shown in Fig. 1. When carrier rod 7 completes its stroke to the left it and its drive box will be rendered inoperative by carrier rod 8, and carrier rod 8 and its drive box will be operatively connected to the drive rod for the following stroke. At the end of this stroke carrier rod 8 and its drive box will be disconnected by carrier rod 6 which will be rendered operative to be driven upon the next drive rod stroke and so on. To this end levers 90 and 91 on drive box are positioned so as to overlie the carrier rod which is to control that drive box and its connected carrier rod. Therefore, in Fig. 1 arms 85 and 86 of drive box 3 (connected to carrier rod 6) which will be referred to as representing the underlying, concealed levers 90 and 91, overlie carrier rod 7, arms 85 and 86 of drive box 5 (connected to carrier rod 8) overlie carrier rod 6 and arms 85 and 86 of drive box 4 (connected to carrier rod 7) overlie carrier rod 8.

A cam plate 96 (Figs. 1, 8 and 9) is so positioned upon each carrier rod that when it is resting at one side of the machine it will engage levers 90 and 91 of the drive box of another carrier rod when it also arrives at that side of the machine. For example, in Fig. 1 the machine is arranged to drive carrier rod 7 to the left, then carrier rod 8 to the right, the carrier rod 6 to the left, and so on in rotation. Drive box 4 which is illustrated in Figs. 8 and 9 is connected to carrier rod 7. Drive dog 58 is in position to be engaged by drive key 61 when drive rod 1 has started to travel to the left because the carrier rod 8 is over at the left and its cam plate 86 with which the selecting mechanism of drive box 4 is arranged to engage is consequently not in engagement with lever 90.

Drive box 3 and its carrier rod 7 which are also positioned at the left (Fig. 1) will remain idle since its selecting mechanism is engaged by cam plate 96 on carrier rod 7 because carrier rod 7 is also resting at the right.

Drive box 3 and its carrier rod 8 resting at the left will not be engaged by cam plate 96 on its controlling carrier rod 6 because that rod is at the right. Therefore, only carrier rod 7 will be driven on this stroke from right to left.

When the end of this stroke has been reached the selecting mechanism of drive box 4 will strike cam plate 96 on carrier rod 8 as shown in Fig. 9. In consequence lever 91 will be lifted, swinging arm 86 and pin 97 and tilting drive dog 46 so that its nose 59 is lifted out of slot 60 of drive rod 1. Cam plate 96 is long enough to maintain nose 59 in this disengaged position until key 62 has passed beyond it on the next stroke of drive rod 1 to the right. Therefore, drive box 4 and its carrier rod 7 will be left behind on the next stroke. The other lever 90 which acts upon the other drive dog 45 also engages cam plate 96 but simply tilts as shown in Fig. 9, without displacing drive dog 45 which cannot engage with the driving face of key 61 anyway at this end of the stroke.

Upon the stroke to the right under discussion carrier rod 8 will be driven by its drive box 5 because its controlling cam plate 96 is on carrier rod 6 which is resting at the right and, consequently, not acting upon levers 90 and 91 so that key 61 and drive dog 58 of drive box 5 will be in driving relation. Carrier rod 6, still resting at the right, will not move because its drive keys have moved beyond it on the previous stroke to the left as described above.

When the end of the stroke of rod 8 to the right is reached the selector mechanism of its drive box 5 will engage with cam plate 96 on carrier rod 6 and arm 90 will rise to release drive dog 45 exactly as lever 91 acted upon the previous stroke as heretofore explained. Therefore, carrier rod 8 will remain idle during the following stroke to the left. The departure of carrier rod 7 from its position at the right upon the stroke first described has removed its cam plate from engagement with levers 90 and 91 of drive box 3. Therefore, carrier rod 6 will be driven upon the next stroke to the left, the previous traverse of drive rod 1 to the right having placed key 61 in driving position again.

In this way the carrier rods are driven in rotation, the driven rod and its drive box being released from the drive rod at the end of its stroke by the cam plate on the next rod to be driven and the third rod being left behind by the initially driven rod because at the time this rod started the drive box of the third rod is disengaged by the cam plate of the initially driven rod.

To state this in another way, between any two strokes the rod to be next driven keeps the other rod at the same side of the machine from being driven. The rod at the other side of the machine is in position to release the driven rod when it arrives upon the next stroke and to be picked up by the driving key which meanwhile has been ineffective because it was moved out of range during the previous drive rod stroke toward the other side of the machine.

The rods may be driven in any other desired order but suitably rearranging the selecting mechanism and carrier rod cam pieces to provide the proper inter-relation as will now be obvious to those skilled in the art in view of the above explanation and description.

Whenever ringless or other sequence knitting is discontinued the selector mechanisms may be put out of action by removing levers 90 and 91 and extensions 87 and 88 from arms 85 and 86 or by removing these arms also from shafts 38. Or, if desired, levers 90 and 91 may be swung up sufficiently to clear cam plates 96 and held in that position by any suitable latch or detent.

To reduce the impact of the carrier rods against their end stops a device for reducing the carrier rod speed just before it strikes the end stop may be included in this invention. As shown in Fig. 12 each clamp 72 is provided with an extension 100 which serves as a seat for a cam block 101 having two opposed curved cam surfaces 102 and 103. As stated, there are two clamps 72 for each drive box. Those shown in Fig. 10 are numbered 78 and 79 it being assumed that drive box 5 is the one shown. The surfaces 102 and 103 of one of each pair of cam blocks are offset from those of the others as shown in Fig. 10.

On swingable blocks 41 and 42 of each drive block arms 56 and 57 are extended laterally as at 104 and 105 to provide bearings for short shafts 106 and 107 on which cam rollers 108 and 109 are rotatably mounted. These shafts are independently slidable in arms 56 and 57 so that either roller 108 or 109 may be moved into position to engage cam block 101 on either clamp 78 or 79. A detent 110 is provided to hold each roller in its adjusted position. These are shown as manually operated detents but, if desired, they and the shifting of the rollers may be automatically governed by a suitable mechanism.

When the carrier rod is being employed for full width knitting so that its clutch fingers 70 and 71 engage with clamp 78 at one end of the stroke to the left and with clamp 79 at the end of the stroke to the right rollers 108 and 109 will be positioned as shown in Fig. 10 so that roller 108 will engage with cam surface 102 on clamp 79 as the drive block approaches the end of its travel to the right and so that roller 109 will engage with cam surface 103 on clamp 78 as the drive block approaches the end of its travel to the left. When roller 108 rides up on cam surface 102 of the cam block on clamp 79 arm 56 and, consequently, drive dog 45 will be swung to the right. Since drive key 61 is at the time driving drive dog 45 before it this supplementary motion of drive dog 45 in the same direction will cause the speed of the drive box and of the carrier rod connected to that drive box to be reduced gradually so that the impact of the carrier rod against its end stop will be lessened. The position and shape of cam surface 102 will, of course, be such that drive dog 45 is not wholly disengaged from the drive key by it until the carrier rod stroke is completed. If preferred the final release of the drive dog may be left to the usual mechanism heretofore described, the rollers and cam surfaces functioning solely as speed reducing means, the roller being lifted clear of the cam surface by the final complete disengagement of the drive dog from its drive key.

At the end of the stroke of the drive box and carrier rod to the roller 109 rides upon cam surface 103 of clamp 78 to swing drive dog 46 to the left to reduce the speed of the drive box and carrier rod at the instant of impact against the left end stop. There is provided in this way a speed reducing means for each carrier rod whenever an end stop is approached.

Means is also provided for similarly reducing the speed of carrier rod travel inward during partial strokes as in heel reinforcing, for example. This involves merely the shifting of one of the rollers 108, 109 so that it will be aligned with the other roller and so that both will engage with the same cam block. For example, in Fig. 12 drive box 5 is shown approaching its right end stop with roller 108 about to ride up on cam surface 102. This will result as explained above in reducing the impact of the carrier rod against its end stop by reducing its speed. Roller 109 will then have been moved from the position shown to slightly beyond the lower end of cam surface 103. If this roller 109 is moved outward into alignment with roller 108 it will ride up on cam surface 103 when the drive box and carrier rod move to the left the short distance required for the reinforcing stroke, their speed reduced and the impact of the carrier rod against its center stop lessened.

If this drive box and carrier rod is selected to reinforce the left heel instead of the right then both rollers will be arranged to engage with cam surfaces 102 and 103 on the left clamp 78 in a similar manner.

For reinforcing other than that in which the sides are parallel as, for example, in the forming of the pointex heel the inner edge of which curves inwardly the speed reducing cam surfaces described above which control the speed of the carrier rods inward towards the center stops should be separated from the other cam surfaces and should be positioned upon the pointex attachment or other mechanism moving in a similar manner so that the relation between them and the center stops will be maintained at all the positions assumed by the center stops. It is not necessary to show this modification in the drawings since it will be readily understood by those skilled in the art. The principle of operation remains the same.

Whenever it is desired to retire a carrier rod from operation, the end stop on the narrowing head is raised in the usual way and the rod pushed out. Since the drive box is still connected to the carrier rod and is still supported by the reciprocating drive rod means is provided to prevent the dragging of the drive box and carrier rod by the drive rod. This is shown in Figs. 13 and 14. It consists of a spring detent 111 attached to any suitably positioned stationary part of the machine as, for example, a block 112 fixed to a stationary shaft 113 and adapted to snap over a finger 114 seated in slot 34 of plate 26 on the drive box. No great holding power is required so that spring 111 may be so shaped that the driving box may be readily released simply by pulling the carrier rod inward. Whenever a rod and its drive box are idle as just described, the drive box is beyond the range of drive keys 61 and 62 so that they cannot engage the drive dogs.

What I claim is:

1. Carrier rod driving mechanism for a flat knitting machine which consists of a reciprocable drive box provided with means adapted to move into and out of engagement with a reciprocable drive rod, and frictionally governed means on said drive box which maintains said rod engaging means in engaging position during the traversing of the drive box by the drive rod and permits said rod engaging means to move out of rod engaging position when the traverse of the drive box has terminated said frictionally governed means including a sleeve slidable within a cylinder and in a frictional relation therewith of substantially constant value.

2. Carrier rod driving mechanism for a flat knitting machine according to claim 1 in which the means adapted to move into and out of engagement with the drive rod consists of a swingable dog.

3. Carrier rod driving mechanism for a flat knitting machine which consists of a reciprocable drive box provided with a pair of opposed dogs each adapted to move into and out of engagement with a reciprocable drive rod, and frictionally governed means on said drive box for maintaining a different one of said pair of dogs in rod engaging position during each successive traverse of the drive box and to permit the dog so held to move out of engaging position after the traverse of the drive box is terminated.

4. Carrier rod driving mechanism for a flat knitting machine which consists of a reciprocable drive box provided with means adapted to move into and out of engagement with a reciprocable drive rod, and frictionally governed means on said drive box which maintains said rod engaging means in engaging position during the traversing of the drive box by the drive rod and permits said rod engaging means to move out of rod engaging position when the traverse of the drive box has terminated, and other frictional means for yieldably holding said drive box against rebound at the end of its traverse which consists of a clutch composed of two members each partially encircling a fixed shaft at least one of said members being provided with a resilient finger adapted to engage a fixed clutch clamp whereby the fingers are moved towards each other to cause the clutch members to make sufficient frictional engagement with said fixed shaft to prevent said drive box from moving except when its drive rod engaging means is in driving engagement with the moving drive rod.

5. Carrier rod driving mechanism for a flat knitting machine which consists of a plurality of reciprocable drive boxes each attached to an individual carrier rod and each provided with means movable into and out of engaging position with a reciprocable drive rod, means on each drive box adapted to maintain said rod engaging means in engaging position during the traverse of the drive box by the drive rod, and means on each drive box operatively associated with a carrier rod other than that to which the drive box is connected for disengaging the rod engaging means from the drive rod at the end of the traverse of the drive box.

6. Carrier rod driving mechanism for a flat knitting machine which consists of a plurality of reciprocable drive boxes each connected to an individual carrier rod, means for reciprocating said drive boxes, means for controlling the reciprocating movements of each of said drive boxes so that it will perform a traverse only for alternate courses of knitting and means on said carrier rods for effecting the operation of said controlling means as said drive boxes are reciprocated by said reciprocating means.

7. Carrier rod driving mechanism for a flat knitting machine which consists of a reciprocable drive box provided with means adapted to move into and out of engagement with a reciprocable drive rod, and frictionally governed means on said drive box which maintains said rod engaging means in engaging position during the traversing of the drive box by the drive rod and permits said rod engaging means to move out of rod engaging position when the traverse of the drive box has terminated, and means for reducing the speed of traverse of said drive box at the end of its traverse to lessen the impact of the carrier rod against its end stop, said last mentioned means consisting of an arm operative on said drive rod engaging means to move it in the direction in which the drive box is moving during the final stage of the traverse of the drive box.

8. Carrier rod driving mechanism for a flat knitting machine which consists of a reciprocable drive box provided with a pair of opposed dogs each adapted to move into and out of engagement with a reciprocable drive rod, and frictionally governed means on said drive box for maintaining a different one of said pair of dogs in rod engaging position during each successive traverse of the drive box and to permit the dog so held to move out of engaging position after the traverse of the drive box is terminated, and means operatively associated with each drive dog for reducing the speed of traverse of the drive box during the final stage of each traverse without affecting the speed of traverse of said drive rod.

9. Carrier rod driving mechanism for a flat knitting machine which consists of a reciprocable drive box provided with a pair of opposed dogs each adapted to move into and out of engagement with a reciprocable drive rod, and frictionally governed means on said drive box for maintaining a different one of said pair of dogs in rod engaging position during each successive traverse of the drive box and to permit the dog so held to move out of engaging position after the traverse of the drive box is terminated, and means operatively associated with each drive dog for reducing the speed of traverse of the drive box during the final stage of each traverse without affecting the speed of traverse of said drive rod, said last mentioned means consisting of an arm connected to each drive dog each arm being engageable with a cam maintained in a definite position in relation to the positions of the drive box at the ends of its traverses whereby the dog which is engaged with the drive rod during a traverse is moved in the same direction as that in which the drive box is moving.

10. Carrier rod driving mechanism for a flat knitting machine which consists of a reciprocable drive box provided with two opposed driving dogs each adapted to engage automatically with a reciprocable drive rod, and means operated by one of the dogs to set the other in drive rod engaging position during alternate drive rod strokes without affecting the operation of the first mentioned dog during that stroke.

11. Carrier rod driving mechanism for a flat knitting machine which consists of a reciprocable drive box provided with two opposed driving dogs each adapted to engage by gravity with a reciprocable drive rod, and means operated by one of the dogs to set the other in drive rod engaging position during alternate drive rod strokes without affecting the operation of the first mentioned dog during that stroke.

12. Carrier rod driving mechanism for a flat knitting machine which consists of a reciprocable drive box provided with a driving dog adapted to engage automatically with a reciprocable drive rod for driving said box in one direction, a similar drive dog similarly engageable with said drive rod to drive said box in the other direction, and means operated by each driving dog for setting the other in operative engagement during alternate strokes of the drive rod.

13. Carrier rod driving mechanism for a flat knitting machine which consists of a reciprocable drive box provided with two freely swingable driving dogs each adapted to move automatically and independently into and out of engagement with a reciprocable drive rod, and means operated by one of the dogs to set the other in driving rod engaging position during alternate drive rod strokes without affecting the free movement of the first mentioned dog during that stroke.

14. Carrier rod driving mechanism for a flat knitting machine which consists of a reciprocable drive box provided with means adapted to move into and out of engagement with a reciprocable drive rod, and frictionally governed means on said drive box which maintains said rod engaging means in engaging position during the traversing of the drive box by the drive rod and permits said rod engaging means to move out of rod engaging position when the traverse of the drive box has terminated, said frictionally governed means including a slide reciprocable in a guide and in frictional relation therewith of substantially constant value.

15. Carrier rod driving mechanism for flat knitting machines according to claim 14 in which the means adapted to move into and out of engagement with the drive rod consists of a swingable dog.

16. Carrier rod driving mechanism for a flat knitting machine which consists of a reciprocable drive box provided with means adapted to move into and out of engagement with a reciprocable drive rod, and frictionally governed means on said drive box which maintains said rod engaging means in engaging position during the traversing of the drive box by the drive rod and permits said rod engaging means to move out of rod engaging position when the traverse of the drive box has terminated, said frictionally governed means consisting of a sleeve slidable within a cylinder and said governing means comprising means for maintaining the friction between said sleeve and said cylinder at a substantially constant value.

17. Carrier rod driving mechanism for a flat knitting machine which consists of a reciprocable drive box provided with a pair of opposed dogs each adapted to move into and out of engagement with a reciprocable drive rod, and frictionally governed means on said drive box for maintaining a different one of said pair of dogs in rod engaging position during each successive traverse of the drive box and to permit the dog so held to move out of engaging position after the traverse of the drive box is terminated, and means for reducing the speed of traverse of said drive box during the final stage of its traverse to reduce the impact of the carrier rod against its end stop.

18. Carrier rod driving mechanism for a flat knitting machine which consists of a reciprocable drive box provided with two opposed driving dogs each adapted to engage automatically with a reciprocable drive rod, and means operated by one of the dogs to set the other in drive rod engaging position during alternate drive rod strokes without affecting the operation of the first mentioned dog during that stroke, and means on each drive box operatively associated with a carrier rod other than that to which the drive box is connected for disengaging the rod engaging means from the drive rod at the end of the traverse of the drive box.

WILLIAM HUG.